(12) United States Patent
Gandhi et al.

(10) Patent No.: US 12,301,458 B2
(45) Date of Patent: *May 13, 2025

(54) SYSTEMS AND METHODS FOR DETERMINING ENERGY EFFICIENCY QUOTIENTS

(71) Applicant: Cisco Technology, Inc., San Jose, CA (US)

(72) Inventors: Indermeet Singh Gandhi, San Jose, CA (US); Robert Edgar Barton, Richmond (CA); Jerome Henry, Pittsboro, NC (US); Cesar Obediente, Apex, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,100

(22) Filed: Jan. 22, 2024

(65) Prior Publication Data

US 2024/0163210 A1    May 16, 2024

Related U.S. Application Data

(63) Continuation of application No. 17/930,281, filed on Sep. 7, 2022, now Pat. No. 11,882,034, which is a
(Continued)

(51) Int. Cl.
*H04L 45/00* (2022.01)

(52) U.S. Cl.
CPC .............. *H04L 45/70* (2013.01); *H04L 45/14* (2013.01)

(58) Field of Classification Search
CPC ....... H04L 45/00; H04L 45/12; H04L 45/125; H04L 45/70; H04L 15/14; H04L 45/302;
(Continued)

(56) References Cited

U.S. PATENT DOCUMENTS 9,482,544 B1 * 11/2016 Konet ................ G01C 21/3469
9,669,231 B1    6/2017 Clark et al.
(Continued)

FOREIGN PATENT DOCUMENTS

CA    3071274 A1    1/2019
CN    106411770 A    2/2017
(Continued)

OTHER PUBLICATIONS

Brockners F., et al., "Requirements for In-situ OAM draft-brockners-inband-oam-requirements-02," Network Working Group, Internet-Draft, Oct. 30, 2016, pp. 1-23.
(Continued)

*Primary Examiner* — Kevin D Mew
(74) *Attorney, Agent, or Firm* — Baker Botts L.L.P.

(57) ABSTRACT

In one embodiment, a method includes receiving energy efficiency data from a plurality of nodes within a network. The method also includes determining an energy efficiency node quotient for each of the plurality of nodes within the network to generate a plurality of energy efficiency node quotients and determining an energy efficiency path quotient for each of a plurality of paths within the network to generate a plurality of energy efficiency path quotients. The method further includes determining one or more policies associated with the plurality of paths and selecting a path from the plurality of paths based at least on the plurality of energy efficient path quotients and the one or more policies.

20 Claims, 4 Drawing Sheets

Related U.S. Application Data continuation of application No. 17/389,634, filed on Jul. 30, 2021, now Pat. No. 11,469,999.

(58) Field of Classification Search
CPC .. H04L 45/306; H04L 45/3065; H04L 45/308
See application file for complete search history.

(56) References Cited

U.S. PATENT DOCUMENTS

| | | | |
|---|---|---|---|
| 2009/0296627 A1* | 12/2009 | Lee | H04B 7/15557 370/315 |
| 2013/0031244 A1 | 1/2013 | Zhang et al. | |
| 2014/0096256 A1* | 4/2014 | Clark | H04L 43/08 726/25 |
| 2014/0189157 A1 | 7/2014 | DeCusatis et al. | |
| 2016/0368396 A1 | 12/2016 | Konet et al. | |
| 2017/0099210 A1 | 4/2017 | Fardid et al. | |
| 2017/0143984 A1 | 5/2017 | Otten et al. | |
| 2019/0283619 A1 | 9/2019 | Metzger et al. | |
| 2019/0386921 A1 | 12/2019 | Pignataro et al. | |
| 2019/0394124 A1 | 12/2019 | Pignataro et al. | |

FOREIGN PATENT DOCUMENTS

| | | |
|---|---|---|
| EP | 3820010 A1 | 5/2021 |
| KR | 20150078413 A | 7/2015 |
| WO | 2008114268 A2 | 9/2008 |
| WO | 2010043723 A2 | 4/2010 |
| WO | 2010094336 A1 | 8/2010 |
| WO | 2012086825 A1 | 6/2012 |
| WO | 2015177495 A1 | 11/2015 |
| WO | WO-2016051411 A1 * 4/2016 ............. H02J 5/005 |
| WO | WO-2018026319 A1 * 2/2018 ........ H04W 52/0206 |

OTHER PUBLICATIONS

Fedrizzi1 R., et al., "Energy Aware Routing in Heterogeneous Multi-Hop Public Safety Wireless Networks", 2014 IEEE International Conference on Communications Workshops (ICC), dated Jun. 10, 2014, pp. 218-225.

International Search Report and Written Opinion for International Application No. PCT/US2022/073834, mailed Oct. 7, 2022, 17 Pages.

Junior A., et al., "Energy-Awareness Metrics Global Applicability Guidelines", draft-ajunior-roll-energy-awareness-01.txt, dated Jan. 10, 2014, 15 pages.

Lasso F.F.J., et al., "Energy-Aware Routing for Software-Defined Multihop Wireless Sensor Networks", IEEE Sensors Journal, vol. 21, No. 8, Apr. 15, 2021, pp. 10174-10182.

Raman S., et al., "Reducing Power Consumption using BGP Path Selection", Internet Engineering Task, Force, IETF, dated Apr. 28, 2013, pp. 1-25.

* cited by examiner

SYSTEMS AND METHODS FOR DETERMINING ENERGY EFFICIENCY QUOTIENTS

PRIORITY

This nonprovisional application is a continuation under 35 U.S.C. § 120 of U.S. patent application Ser. No. 17/930,281 filed on Sep. 7, 2022 which is a continuation under 35 U.S.C. § 120 of U.S. patent application Ser. No. 17/389,634 filed on Jul. 30, 2021, which is a utility filing entitled "Systems and Methods for Determining Energy Efficiency Quotients," which is hereby incorporated by reference in its entirety.

TECHNICAL FIELD

The present disclosure relates generally to communication networks, and more specifically to systems and methods for determining energy efficiency quotients.

BACKGROUND

One of the goals of Green Information Technology ("Green IT") is to maximize the energy efficiency of computer resources. A growing number of organizations, by choice or for regulatory reasons, have implemented "Green IT" computing initiatives to reduce their energy footprint. Networks and data centers are two large sources of energy expenditure.

DESCRIPTION OF EXAMPLE EMBODIMENTS

Overview

Figure 1:
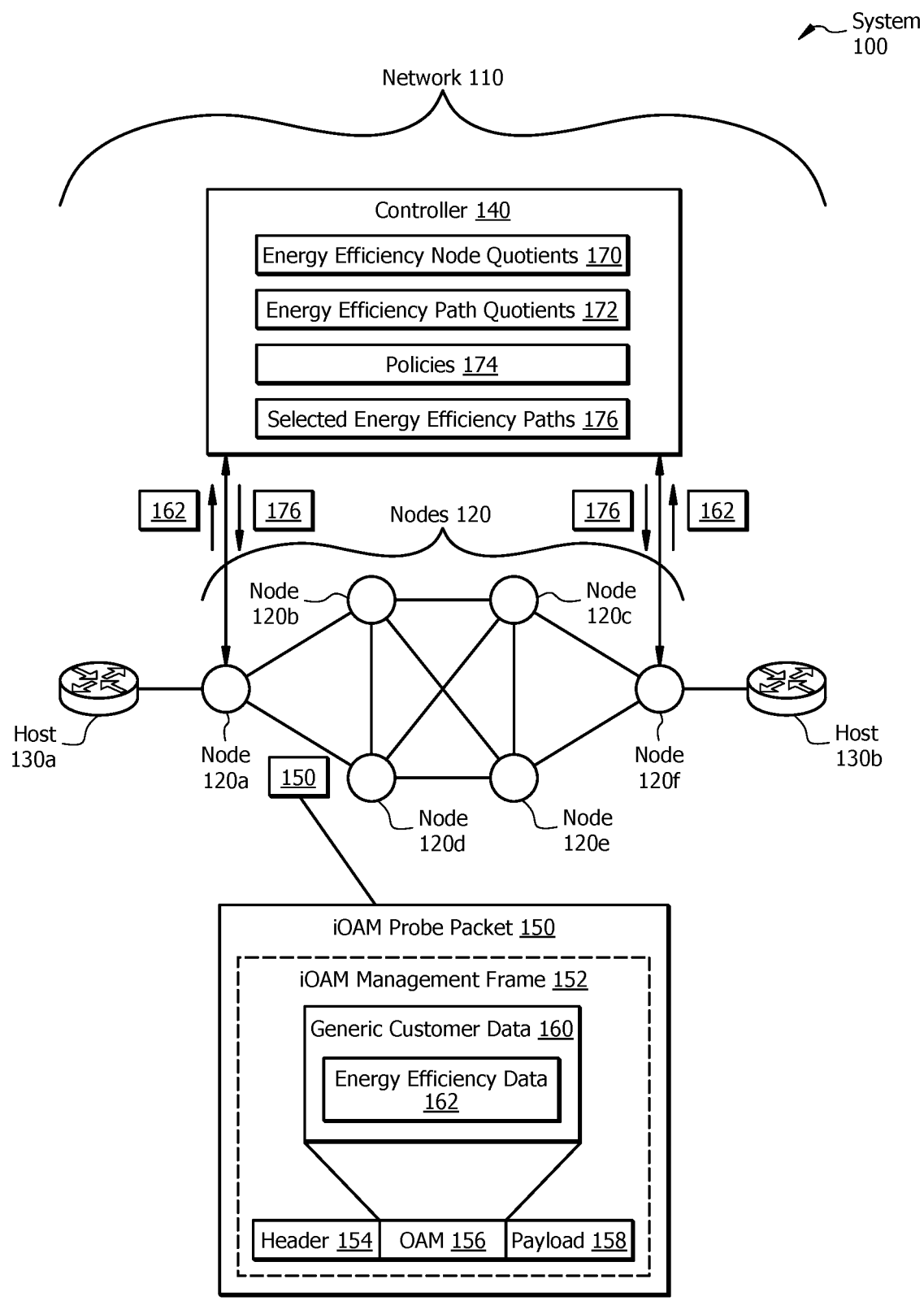
FIG. 1 illustrates an example system for determining energy efficiency quotients.

According to an embodiment, a controller includes one or more processors and one or more computer-readable non-transitory storage media coupled to the one or more processors and including instructions that, when executed by the one or more processors, cause the controller to perform operations. The operations include receiving energy efficiency data from a plurality of nodes within a network. The operations also include determining an energy efficiency node quotient for each of the plurality of nodes within the network to generate a plurality of energy efficiency node quotients and determining an energy efficiency path quotient for each of the plurality of paths within the network to generate a plurality of energy efficiency path quotients. The operations further include determining one or more policies associated with the plurality of paths and selecting a path from the plurality of paths based at least on the plurality of energy efficient path quotients and the one or more policies. In some embodiments, the operations include ranking the plurality of paths from most energy efficient to least energy efficient based on the plurality of energy efficiency path quotients.

In certain embodiments, the energy efficiency data includes at least one of the following: a product type associated with at least one node of the plurality of nodes; a power source associated with at least one node of the plurality of nodes; a number of power supplies connected to at least one node of the plurality of nodes; an identification of one or more modules installed on at least one node of the plurality of nodes; a power consumption efficiency associated with at least one node of the plurality of nodes; and an indication of whether an energy source is renewable or non-renewable.

In some embodiments, the energy efficiency data is in-situ Operations, Administration, and Maintenance (iOAM) data that is collected by iOAM probe packets. In certain embodiments, the energy efficiency node quotient for a particular node of the plurality of nodes is calculated by dividing a total aggregate throughput of the particular node by a total power consumption of the particular node at a given moment in time.

In certain embodiments, the one or more policies include at least one service-level agreement (SLA) policy that includes SLA requirements associated with latency, jitter, and loss. In some embodiments, the one or more policies include at least one cost policy associated with at least one of the following: a cost per kilowatt-hour (kWh) consumed or a cloud computing cost.

According to another embodiment, a method includes receiving energy efficiency data from a plurality of nodes within a network. The method also includes determining an energy efficiency node quotient for each of the plurality of nodes within the network to generate a plurality of energy efficiency node quotients and determining an energy efficiency path quotient for each of a plurality of paths within the network to generate a plurality of energy efficiency path quotients. The method further includes determining one or more policies associated with the plurality of paths and selecting a path from the plurality of paths based at least on the plurality of energy efficient path quotients and the one or more policies.

According to yet another embodiment, one or more computer-readable non-transitory storage media embody instructions that, when executed by a processor, cause the processor to perform operations. The operations include receiving energy efficiency data from a plurality of nodes within a network. The operations also include determining an energy efficiency node quotient for each of the plurality of nodes within the network to generate a plurality of energy efficiency node quotients and determining an energy efficiency path quotient for each of the plurality of paths within the network to generate a plurality of energy efficiency path quotients. The operations further include determining one or more policies associated with the plurality of paths and selecting a path from the plurality of paths based at least on the plurality of energy efficient path quotients and the one or more policies.

Technical advantages of certain embodiments of this disclosure may include one or more of the following. This disclosure allows networks to direct network traffic based on energy efficiency. In certain embodiments, iOAM fields are enhanced within iOAM probe packets to query nodes along a network path about their current energy consumption. Since each node among the path may provide a different energy efficiency value depending on the product type, the number of connected power supplies, the type of installed modules, etc., network paths can be analyzed and ranked based on energy efficiency. In some embodiments, policies may be applicable on particular sites/branches, on a per-application basis, on a per-user basis, etc. In a per-user basis, a user may indicate a preference for an organization to select an energy efficient ("green") path. As such, the systems and methods described herein may allow for static and/or dynamic optimization. In certain embodiments, a user and/or enterprise may establish performance-to-green goals such that network traffic reverts to greener links when possible.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

This disclosure describes systems and methods for determining energy efficiency quotients. Software-defined wide area network (SD-WAN) solutions are currently capable of directing traffic based on SLA definitions. These SLA definitions in conjunction with a policy to match and classify traffic types may be used to direct traffic over specific SD-WAN tunnels. The SLA definition typically involves values of throughput/goodput, loss, latency, and jitter. However, none of the existing routing decisions incorporate an energy efficiency metric for the chosen path. For example, at a particular branch office, a 5G or Long-Term Evolution (LTE) connection may be preferred based on the SD-WAN SLA requirements. The "best" path may simply be the top performer for the SLA requirements. However, the performance-preferred path may utilize network resources that consume far more energy than an alternative path (such as an alternate backhaul route or an alternate routed path through the network that consumes far less energy). In some cases, the alternate paths do not meet the SLA requirements. However, in other cases, these alternate paths may still meet the SLA requirements while providing better ("greener") energy efficiency. This disclosure provides a method to add an energy efficiency dimension to SD-WAN path selection by employing iOAM to collect energy efficiency data from nodes along available network paths, which allows SD-WAN services to select a "greener" path to a destination.

FIG. 1 illustrates an example system 100 for determining energy efficiency quotients. System 100 or portions thereof may be associated with an entity, which may include any entity, such as a business, a company, or enterprise, that determines energy efficiency quotients. The components of system 100 may include any suitable combination of hardware, firmware, and software. For example, the components of system 100 may use one or more elements of the computer system of FIG. 4. In the illustrated embodiment of FIG. 1, system 100 includes a network 110, nodes 120, hosts 130, and a controller 140.

Network 110 of system 100 is any type of network that facilitates communication between components of system 100. Network 110 may connect one or more components of system 100. One or more portions of network 110 may include an ad-hoc network, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), an SD-WAN, a metropolitan area network (MAN), a portion of the Internet, a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 110 may include one or more different types of networks. Network 110 may be any communications network, such as a private network, a public network, a connection through the Internet, a mobile network, a WI-FI network, etc. One or more components of system 100 may communicate over network 110. Network 110 may include a core network (e.g., the Internet), an access network of a service provider, an Internet service provider (ISP) network, and the like.

Nodes 120 of system 100 are connection points within network 110 that receive, create, store and/or send data along a path. Nodes 120 may include one or more redistribution points that recognize, process, and forward data to other nodes 120 of network 110. Nodes 120 may include virtual and/or physical nodes. For example, nodes 120 may include one or more virtual machines, bare metal servers, and the like. As another example, nodes 120 include data communications equipment such as routers (e.g., edge routers, headend routers, etc.), servers, printers, workstations, switches, bridges, modems, hubs, and the like. In certain embodiments, nodes 120 include endpoints such as SD-WAN endpoints. In the illustrated embodiment of FIG. 1, nodes 120 include node 120a, node 120b, node 120c, node 120d, node 120e, and node 120f.

Hosts 130 of system 100 are virtual or physical devices connected to network 110. Hosts 130 may include hardware devices such as computers, personal electronic devices, clients, multi-functional devices, and the like. In certain embodiments, hosts 130 permit access to network 110 via user interfaces, specialized software, network addresses, protocol stacks, or any other suitable means. Hosts 130 may perform as servers to offer information resources, services, and/or applications to users or other hosts 130 within system 100. For example, hosts 130 may route application traffic to/from one or more other components of system 100. Each host 130 may be associated with a particular entity, such as a business, a company, an enterprise, and the like. Each host 130 may be located within a physical office, a physical branch office, a physical residence, a network cloud, etc. In certain embodiments, each host 130 is assigned at least one network address. In the illustrated embodiment of FIG. 1, hosts 130 include host 130a and host 130b.

iOAM probe packets 150 of system 100 are packets used to monitor and collect data about network 110. In the illustrated embodiment of FIG. 1, iOAM probe packets 150 carry iOAM information such as OAM and telemetry data. OAM are the processes, activities, tools, and/or standards involved with operating, administering, maintaining, and/or managing system 100. OAM information may include information such as such as node ID, ingress interface ID, egress interface ID, timestamp, proof of transit, sequence numbers, application metadata, generic customer data, and the like. "In-situ," also known as "in-band," indicates that the OAM and telemetry data is carried along with the original data packets rather than being sent within packets specifically dedicated to OAM. In the illustrated embodiment of FIG. 1, iOAM fields of iOAM probe packets 150 are enhanced to report energy efficiency data 162 as an additional aspect of metadata.

Energy efficiency data 162 of system 100 is data that is used to determine energy consumption of one or more nodes 120 of network 110. Energy efficiency data 162 may include a product type associated with one or more nodes 120, a power source (2880 Watts, 6000 Watts, etc.) associated with one or more nodes 120, a number of power supplies connected to one or more nodes 120, an indication of the types modules installed on one or more nodes 120, a power consumption efficiency of one or more nodes 120, an indication of whether the energy source of one or more nodes 120 is renewable/nonrenewable, and the like. The product type may include an indication of whether each node 120 is a router, a gateway, a chassis, a switch, etc. In certain embodiments, the product type includes a serial number, a model number, or any other suitable indication identifying one or more nodes 120. In certain embodiments, each node 120 along paths traversed by iOAM data packets 150 imprints its energy efficiency data 162 into an iOAM management frame 152.

iOAM management frame 152 includes a header field 154, an OAM field 156, and a payload field 158. OAM field 156 is an extension of header field 154. OAM traffic is embedded in OAM field 156 of management frame 152 rather than in payload field 158 of management frame 152. OAM field 156 collects OAM information such as node ID, ingress interface ID, egress interface ID, timestamp, proof of transit, sequence numbers, application metadata, generic customer data, and the like. One or more OAM fields 156, such as the generic customer data field, may be enhanced to report energy efficiency data 162 as an additional aspect of the metadata.

In certain embodiments, one or more nodes 120 initiate one or more iOAM probe packets 150 along possible paths through network 120. For example, node 120a (e.g., an SD-WAN endpoint) may initiate iOAM probe packet 150 along a path from node 120a to node 120b, from node 120b to node 120c, and from node 120c to node 120f. As another example, node 120a (e.g., an SD-WAN endpoint) may initiate iOAM probe packet 150 along a path from node 120a to node 120d, from node 120d to node 120e, and from node 120e to node 120f. As still another example, node 120a (e.g., an SD-WAN endpoint) may initiate iOAM probe packet 150 along a path from node 120a to node 120b, from node 120b to node 120e, and from node 120e to node 120f. While the path begins at node 120a (e.g., an SD-WAN edge router) and terminates at node 120f (e.g., an SD-WAN headend router), iOAM probe packets 150 may traverse any or all available paths. In certain embodiments, iOAM information (e.g., energy efficiency data 162) is collected along each traversed path within iOAM data packet 150. Energy efficiency data 162 is communicated to controller 140.

Controller 140 of system 100 is a component that collects and analyzes iOAM information. In certain embodiments, controller 140 is an SD-WAN controller. Controller 140 may include one or more smart controllers, management controllers, orchestrators, and the like. Controller 140 may be deployed by any entity such as a business, a company, an enterprise, and the like. In certain embodiments, controller 140 is associated with an entity such as a service provider (e.g., an ISP). In some embodiments, controller 140 may record energy efficiency data 162 collected along one or more paths of network 110 and enter energy efficiency data 162 into a database. Controller 140 may include one or more components of the computer system of FIG. 4.

In certain embodiments, controller 140 determines energy efficiency node quotients 170 for one or more nodes 120 of network 110. Controller 140 may determine energy efficiency node quotients 170 using energy efficiency data 162 received from nodes 120 of network 110. For example, each energy efficiency node quotient 170 may represent the total aggregate throughput of particular node 120 divided by the total power consumption at a given moment in time (i.e., the energy cost of a single unit of data throughput in terms of bits per second). In certain embodiments, controller 140 uses energy efficiency data 162 associated with particular node 120, such as the product type associated with each node 120, a power source associated with each node 120, a number of power supplies connected to each node 120, an identification of one or more modules installed on each node 120, a power consumption efficiency associated with each node 120, an indication of whether the energy source is renewable or non-renewable, etc. The energy expenditure may be calculated by assigning different factors different weights. For example, the indication of whether the energy source associated with particular node 120 is renewable or non-renewable may be given more weight than the number of power supplies connected to particular node 120. Controller 140 then derives energy efficiency node quotient 170 by comparing the energy expenditure to the network characteristics (throughput/goodput, loss, jitter, delay, etc.) associated with node 120. In some instances, an old device having a poor energy efficiency rating may score lower (less energy efficient) than a new device having a better energy efficiency rating. In some embodiments, each node 120 may calculate its own energy efficiency node quotient 170 and communicate its energy efficiency node quotient 170 to controller 140.

In certain embodiments, controller 140 computes energy efficiency node quotients 170 for each node 120 of network 110 and then summarizes energy efficiency node quotients 170 for each node 120 along each available path. For example, a first path with many hops may have relatively low latency due to fast (e.g., 400GE) connections, but the energy consumption may be relatively high along this path because each node 120 is a large unit. A second path with higher latency may require less energy due to the lower number of hops and/or the type of hardware used.

In some embodiments, controller 140 generates energy efficiency path quotients 172 for one or more available paths of network 110. In certain embodiments, controller 140 may generate energy efficiency path quotients 172 based on energy efficiency node quotients 170. For example, controller 140 may generate energy efficiency path quotient 172 for a path traversing node 120a, node 120b, node 120c, and node 120f using energy efficiency node quotients 170 of node 120a, node 120b, node 120c, and node 120f. In certain embodiments, energy efficiency path quotient 172 of a particular path may be an average of energy efficiency node quotients 170 of nodes 120 along the particular path. After computing energy efficiency path quotients 172 of one or more paths of network 110, controller 140 may rank the paths in order of efficiency. For example, controller may rank the paths from most efficient (e.g., "greenest") to least efficient.

In certain embodiments, controller 140 determines whether one or more paths of system 100 satisfy one or more policies 174 (e.g., SD-WAN policies). Policies 174 may be applicable on particular sites/branches, on a per-application basis, on a per-user basis, etc. In a per-user basis, a user may indicate a preference for an organization to select an energy efficient ("green") path. As such, controller 140 may allow for static and/or dynamic optimization. A user and/or enterprise may establish performance-to-green goals. In response, controller 140 may direct traffic volume spikes to high performance links and revert to greener links when possible.

Policies 174 may include one or more SLA policies, cost policies, energy efficiency policies, and the like. For example, controller 140 may determine whether one or more paths satisfy the SLA requirements of policy 174 for throughput, goodput, loss, latency and/or jitter. As another example, controller 140 may determine whether one or more paths satisfy the requirements of policy 174 for overall cost (e.g., a cost per kWh consumed, a cloud computing cost, etc.). As yet example, controller 140 may determine whether one or more paths satisfy the requirements of policy 174 for energy efficiency.

In certain embodiments, controller 140 determines whether each energy efficiency ranked path satisfies the requirements of other or more policies 174. Based on this determination, controller 140 may select one or more energy efficiency paths 176. For example, controller 140 may rank a plurality of paths from most energy efficient to least energy efficient based on energy efficiency node quotients 170 and/or energy efficiency path quotients 172. Controller 140 may then determine whether the most energy efficient path (i.e., the highest ranked path) satisfies the requirements of one or more policies 174. If controller 140 determines that the highest ranked energy efficiency path satisfies the requirements of one or more policies 174, controller 140 chooses the highest ranked energy efficiency path as selected energy efficiency path 176. If controller 140 determines that the highest ranked energy efficiency path fails to satisfy the requirements of one or more policies 174, controller 140 chooses the next highest ranked energy efficiency path, and so on, until the next highest ranked energy efficiency path satisfies the SLA requirements of one or more policies 174.

In operation, node 120a (an endpoint) of network 110 of system 100 initiates iOAM probe packets 150 along all available paths to node 120f (an endpoint). iOAM probe packets 150 collect energy efficiency data 162 within generic customer data field 160 of each iOAM management frame 152. Energy efficiency data 162 may include a product type associated with each node 120, a power source associated with each node 120, a number of power supplies connected to each node 120, an identification of one or more modules installed on each node 120, a power consumption efficiency associated with each node 120, an indication of whether the energy source is renewable or non-renewable, and the like. Controller 140 receives energy efficiency data 162 from node 120a and node 120f of network 110 and uses energy efficiency data 162 to determine energy efficiency node quotient 170 for each node 120 traversed by iOAM probe packets 150. Each energy efficiency node quotient 170 may be calculated by dividing a total aggregate throughput of particular node 120 by a total power consumption of particular node 120 at a given moment in time. Controller 140 uses energy efficiency node quotients 170 to generate a plurality of energy efficiency path quotients 172 for all available paths from node 120a to node 120f. Controller 140 ranks the plurality of paths from most energy efficient to least energy efficient based on energy efficiency path quotients 172. Controller 140 determines one or more policies 174 (e.g., SLA policies, cost policies, etc.) associated with the paths and selects energy efficient path 176 from the available paths based on energy efficient path quotients 172 and/or policies 174. As such, system 100 adds an energy efficiency dimension to path selection by employing iOAM to record energy efficiency data 162 of all available paths, which allows system 100 to choose a greener path to a destination.

Although FIG. 1 illustrates a particular number of networks 110, nodes 120, hosts 130, controllers 140, and iOAM probe packets 150, this disclosure contemplates any suitable number of networks 110, nodes 120, hosts 130, controllers 140, and iOAM probe packets 150. For example, system 100 may include more than one network 110, more or less than six nodes 120, more than two hosts 130, and/or more than one controller 140. Although FIG. 1 illustrates a particular arrangement of network 110, nodes 120, hosts 130, controller 140, and iOAM probe packet 150, this disclosure contemplates any suitable arrangement of network 110, nodes 120, hosts 130, controller 140, and iOAM probe packet 150. Furthermore, although FIG. 1 describes and illustrates particular components, devices, or systems carrying out particular actions, this disclosure contemplates any suitable combination of any suitable components, devices, or systems carrying out any suitable actions.

Figure 2:
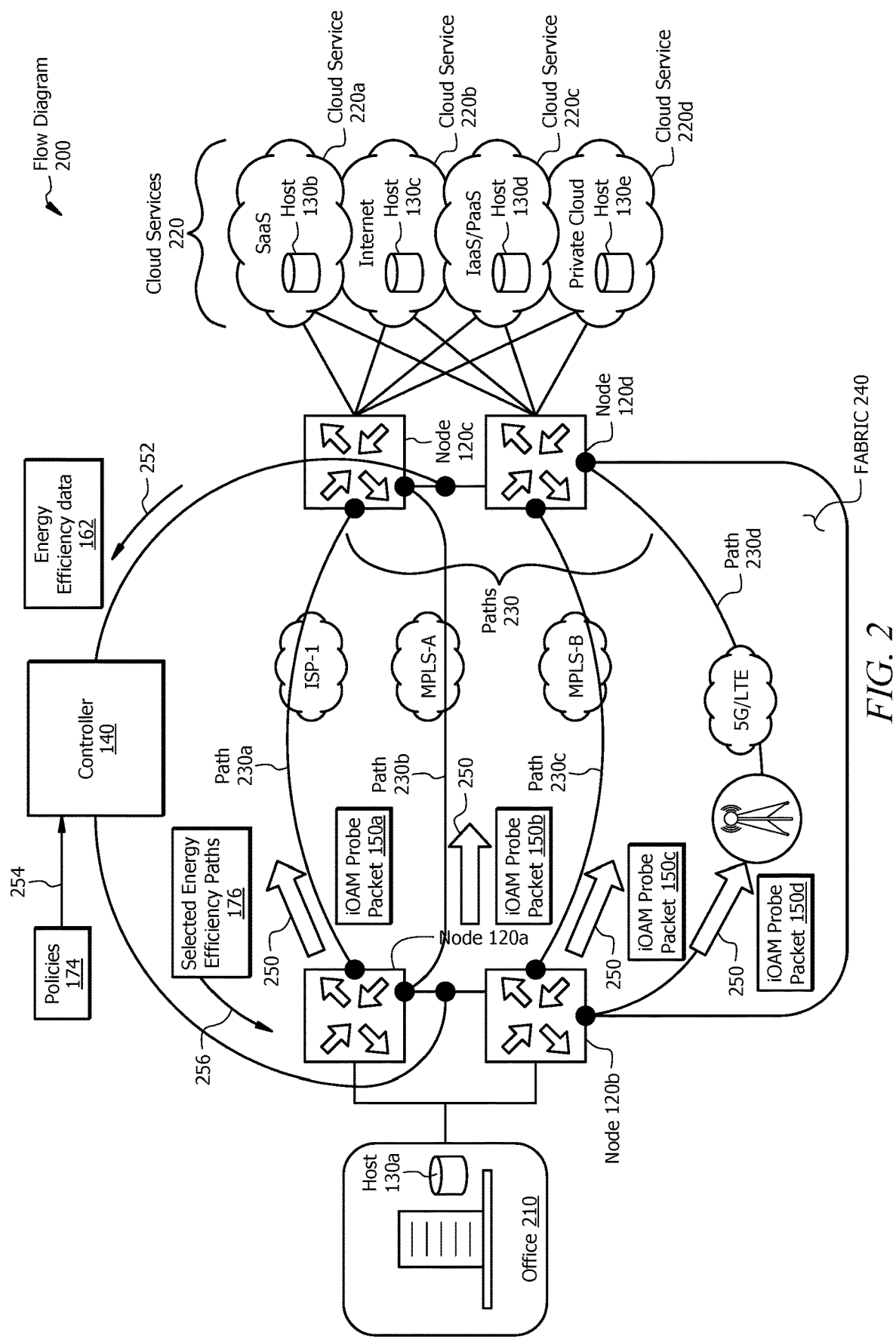
FIG. 2 illustrates an example flow diagram for determining energy efficiency quotients.

FIG. 2 illustrates an example flow diagram 200 for determining energy efficiency quotients. FIG. 2 includes nodes 120, hosts 130, and controller 140, which are described above in FIG. 1. In the illustrated embodiment of FIG. 2, node 120a, node 120b, node 120c, and node 120d of nodes 120 are endpoints. For example, node 120a and node 120b may be edge routers (e.g., SD-WAN edge routers), and node 120c and node 120d may be headend routers. The illustrated embodiment of FIG. 2 also includes an office 210, cloud services 220, paths 230, and a fabric 240.

Office 210 of FIG. 2 is a location where a business is conducted. Office 210 may be a main office, a branch office, and the like. In the illustrated embodiment of FIG. 2, office includes host 130a. Cloud services 220 of FIG. 2 are services that are available via a remote cloud computing network element (e.g., a server). Cloud computing is an on-demand availability of computer system resources, such as data storage and computing power, without direct active management by the user. Cloud services 220 may be associated with one or more of the following cloud service providers Amazon Web Services (AWS), Microsoft Azure, Google Cloud, Alibaba Cloud, IBM Cloud, Oracle, Salesforce, SAP, Rackspace Cloud, VMWare, etc.

Cloud services 220 are offered in different service models based on business requirements. Cloud service models may include Software as a Service (SaaS), Platform as a Service (PaaS), Infrastructure as a Service (IaaS), Function as a Service (FaaS), the Internet, one or more private cloud services, and the like. In the illustrated embodiment of FIG. 2, cloud services 220 include cloud service 220a, cloud service 220b, could service 220c, and cloud service 220d. Cloud service 220a is an SaaS that includes host 130b, cloud service 220b is an Internet service that incudes host 220c, cloud service 220c is an IaaS/PaaS that includes host 130d, and cloud service 220d is a private cloud service that includes host 130e. Fabric 240 is a type of network topology where all nodes 120 are interconnected to all other nodes 120. In the illustrated embodiment of FIG. 2, fabric 240 is an SD-WAN-iOAM fabric.

Notations 250 through 256 are used to describe flow diagram 200 of FIG. 2. Notation 250 indicates the flow of iOAM probe packets 150 from node 120a and node 120b to node 120c and node 120d. Node 120a initiates iOAM probe packet 150a along path 230a to node 120c. Path 230a is associated with an ISP network (ISP-1). Node 120a initiates iOAM probe packet 150b along path 230b to node 120c. Path 230b is associated with an MPLS network (MPLS-A). Node 120b initiates iOAM probe packet 150c along path 230c to node 120d. Path 230c is associated with an MPLS network (MPLS-B). Node 120b initiates iOAM probe packet 150d along path 230d to node 120d. Path 230d is associated with a cellular network (5G/LTE).

iOAM probe packets 150 collect energy efficiency data 162 as they traverse along paths 230. iOAM probe packet 150a collects energy efficiency data 162 from nodes 120 along path 230a, iOAM probe packet 150b collects energy efficiency data 162 from nodes 120 along path 230b, iOAM probe packet 150c collects energy efficiency data 162 from nodes 120 along path 230c, and iOAM probe packet 150d collects energy efficiency data 162 from nodes 120 along path 230d. Energy efficiency data 162 may be collected within a generic customer data field of an iOAM management frame of each iOAM probe packet 150. Energy efficiency data 162 may include a product type associated with each node 120, a power source associated with each node 120, a number of power supplies connected to each node 120, an identification of one or more modules installed on each node 120, a power consumption efficiency associated with each node 120, an indication of whether the energy source is renewable or non-renewable, and the like.

At notation 252, controller 140 receives energy efficiency data 162 from nodes 120c and node 120d. Controller 140 determines energy efficiency node quotients and/or energy efficiency path quotients from energy efficiency data 162. Controller 140 may rank paths 230 from most energy efficient to least energy efficient based on the energy efficiency node quotients and/or energy efficiency path quotients. For example, controller 140 may rank the paths in the following order from most energy efficient to least energy efficient: path 230b, path 230d, path 230a, and path 230c.

At notation 254, controller 140 receives one or more policies 174 (e.g., SLA policies, cost policies, etc.) associated with paths 230. One or more policies 174 may require controller 140 to select a path that satisfies certain criteria. For example, an SLA policy may require controller 140 to select a path that satisfies minimum requirements for latency, loss, and jitter. In certain embodiments, controller 140 determines one or more properties associated with each path 230. For example, controller 140 may determine the following properties for paths 230: path 230a experiences 10 milliseconds (ms) of latency, 0 percent loss, and 5 ms of jitter; path 230b experiences 200 ms of latency, 3 percent loss, and 5 ms of jitter; path 230c experiences 140 ms of latency, 1 percent loss, and 11 ms of jitter; and path 230d experiences 120 ms of latency, 1 percent loss, and 10 ms of jitter. From these properties, controller 140 may determine that path 230a, path 230c, and path 230d satisfy an application's SLA requirement and that path 230b fails an application's SLA requirement. Based on SLA policy 174, controller may select path 230d since path 230d is the most energy efficient path that satisfies the application's SLA requirement. At notation 256 of flow diagram 200, controller 140 instructs node 120a and node 120b to direct application traffic received from host 130a to path 230d. As such, application traffic sent from host 130a of office 210 to host 130b, host 130c, host 130d, or host 130e of cloud services 220 is directed along path 230d, which satisfies the SLA requirements of the application while also providing a "greener" route alternative as compared to the other available paths.

Although FIG. 2 illustrates a particular number of nodes 120, hosts 130, controllers 140, iOAM probe packets 150, offices 210, cloud services 220, paths 230, and fabrics 240, this disclosure contemplates any suitable number of networks 110, nodes 120, hosts 130, controllers 140, iOAM probe packets 150, offices 210, cloud services 220, paths 230, and fabrics 240. For example, flow diagram 200 may include more or less than more or less than four cloud services 220. As another example, flow diagram 200 may include more or less than four paths 230.

Although FIG. 2 illustrates a particular arrangement of nodes 120, hosts 130, controller 140, iOAM probe packets 150, office 210, cloud services 220, paths 230, and fabric 240, this disclosure contemplates any suitable arrangement of nodes 120, hosts 130, controller 140, iOAM probe packets 150, office 210, cloud services 220, paths 230, and fabric 240. For example, the location of office 210 and cloud services 220 may be switched. As another example, iOAM probe packets 150 may travel in either direction or bidirectionally along paths 230 of FIG. 2.

Furthermore, although FIG. 2 describes and illustrates particular components, devices, or systems carrying out particular actions, this disclosure contemplates any suitable combination of any suitable components, devices, or systems carrying out any suitable actions. For example, one or more nodes 120 may calculate one or more energy efficiency node quotients and/or energy efficiency path quotients.

Figure 3:
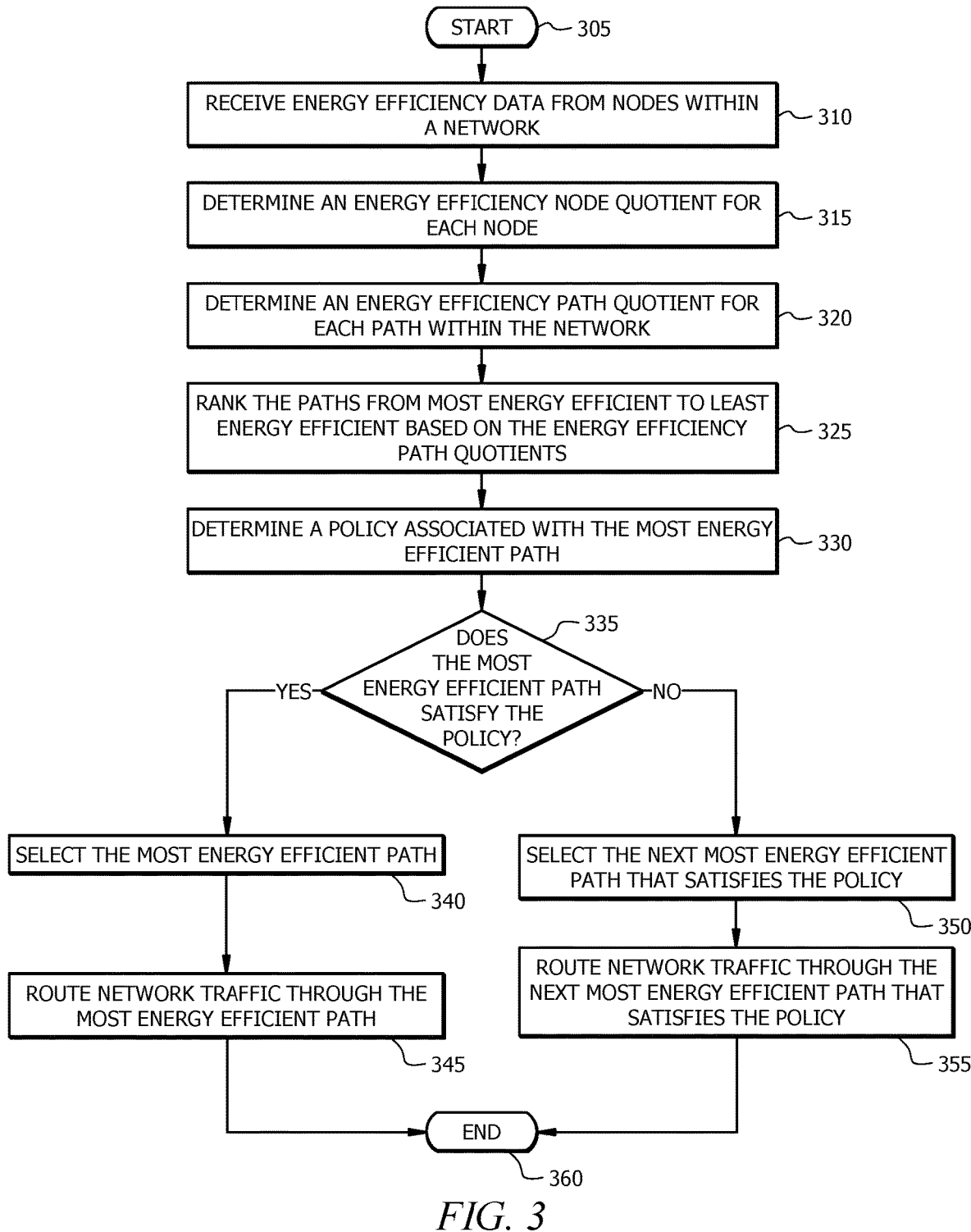
FIG. 3 illustrates an example method for determining energy efficiency quotients.

FIG. 3 illustrates an example method 300 for determining energy efficiency quotients. Method 300 begins at step 305. At step 310, a controller (e.g., controller 140 of FIG. 1) receives energy efficiency data (e.g., energy efficiency data 162 of FIG. 1) from one or more nodes of a network (e.g., one or more nodes 120 of network 110 of FIG. 1). In certain embodiments, one or more nodes of the network may initiate iOAM probe packets (e.g., iOAM probe packets 150 of FIG. 1) along all available paths of the network. The iOAM probe packets may collect energy efficiency data within generic customer data fields of iOAM management frames (e.g., iOAM management frame 152 of FIG. 1) of each iOAM probe packet. Energy efficiency data may include a product type associated with each node, a power source associated with each node, a number of power supplies connected to each node, an identification of one or more modules installed on each node, a power consumption efficiency associated with each node, an indication of whether the energy source is renewable or non-renewable, and the like. The controller receives the iOAM energy efficiency data collected by the iOAM probe packets from one or more nodes of the network. Method 300 then moves from step 310 to step 315.

At step 315 of method 300, the controller determines energy efficiency node quotients (e.g., efficiency node quotients 170 of FIG. 1) for each node traversed by the iOAM probe packets. In certain embodiments, energy efficiency node quotients are calculated by dividing a total aggregate throughput of a particular node by a total power consumption of the particular node at a given moment in time. Method 300 then moves from step 315 to step 320, where the controller generates energy efficiency path quotients (e.g., efficiency path quotients 172 of FIG. 1) for each available path (e.g., path 230 of FIG. 2) of the network. In certain embodiments, the controller may use the energy efficiency node quotients to generate the energy efficiency path quotients. For example, the energy efficiency path quotient for a particular path may be an average of the energy efficiency node quotients of the nodes along the particular path. Method 300 then moves from step 320 to step 325.

At step 325 of method 300, the controller ranks the available paths of the network from most energy efficient to least energy efficient. The controller may rank the paths based on the energy efficiency path quotients. Method 300 then moves from step 325 to step 330, where the controller determines one or more policies (e.g., policies 174 of FIG. 1) associated with the path. The policies may include SLA polices, cost policies, and the like. For example, an SLA policy may include SLA requirements for latency, jitter, loss, etc. As another example, a cost policy may include requirements for cost per kWh consumed, a cloud cost, etc. Method 300 then moves from step 330.

At step 335 of method 300, the controller determines whether the most energy efficient path satisfies the policy requirements. For example, the controller may determine whether the most energy efficient path satisfies minimum SLA requirements for latency, jitter, and loss. If the controller determines that the most energy efficient path satisfies the policy requirements, method 300 moves from step 335 to step 340, where the controller selects the most energy efficient path. Method 300 then moves from step 340 to step 345, where the controller instructs the endpoint nodes to route network traffic through the most energy efficient path.

If, at step 335, the controller determines that the most energy efficient path fails to satisfy the policy requirements, method 300 advances from step 335 to step 350, where the controller selects the next most energy efficient path that satisfies the policy requirements. Method 300 then moves from step 350 to step 355, where the controller instructs the endpoint nodes to route network traffic through the next most energy efficient path. Method 300 then moves from step 345 and step 355 to step 360, where method 300 ends.

Although this disclosure describes and illustrates particular steps of the method of FIG. 3 as occurring in a particular order, this disclosure contemplates any suitable steps of the method of FIG. 3 occurring in any suitable order. For example, step 330 directed to determining a policy associated with the most energy efficient path may occur as the first step of method 300.

Although this disclosure describes and illustrates an example method for determining energy efficiency quotients including the particular steps of the method of FIG. 3, this disclosure contemplates any suitable method for determining energy efficiency quotients including any suitable steps, which may include all, some, or none of the steps of the method of FIG. 3, where appropriate. For example, method 300 may include a step where the network component determines whether the most energy efficient path satisfies the requirements of a second policy. As another example, method 300 may select, at step 340, the most energy efficient path without taking into consideration a policy.

Although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3. For example, one or more nodes of the network may determine the energy efficiency node quotients and/or the energy efficiency path quotients.

Figure 4:
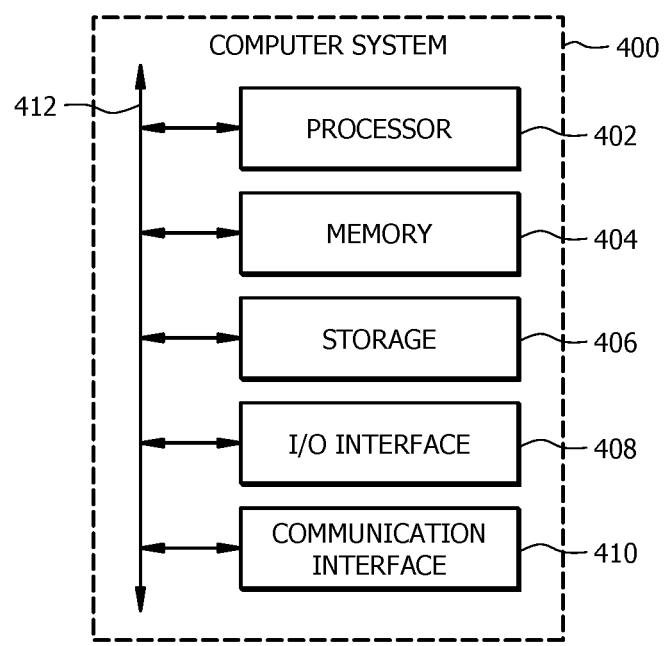
FIG. 4 illustrates an example computer system that may be used by the systems and methods described herein.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A network node, comprising:
one or more processors; and
one or more computer-readable non-transitory storage media coupled to the one or more processors and comprising instructions that, when executed by the one or more processors, cause the network node to perform operations comprising:
generating energy efficiency data;
receiving information from a controller;
selecting a first path from a plurality of paths within a network based on the information; and
directing application traffic along the first path, wherein the first path is associated with an energy efficiency path quotient.

2. The network node of claim 1, wherein the energy efficiency data comprises in-situ Operations, Administration, and Maintenance (iOAM) data that is collected by one or more iOAM probe packets.

3. The network node of claim 2, wherein:
the network node is a software-defined wide area network (SD-WAN) endpoint;
the network is an SD-WAN network; and
the network node initiates the one or more iOAM probe packets along possible paths through the SD-WAN network.

4. The network node of claim 2, wherein:
an iOAM probe packet of the one or more iOAM probe packets comprises an iOAM management frame; and
the iOAM probe packet collects the energy efficiency data within a generic customer data field of the iOAM management frame.

5. The network node of claim 1, wherein the energy efficiency path quotient is based at least in part on an energy efficiency node quotient associated with the network node.

6. The network node of claim 5, wherein the energy efficiency node quotient is calculated by dividing a total aggregate throughput of the network node by a total power consumption of the network node at a given moment in time.

7. The network node of claim 1, wherein the energy efficiency data comprises at least one of the following:
a product type associated with the network node;
a power source associated with the network node;
a number of power supplies connected to the network node;
an identification of one or more modules installed on the network node;
a power consumption efficiency associated with the network node; or
an indication of whether an energy source associated with the network node is renewable or non-renewable.

8. A method, comprising:
generating, by a network node, energy efficiency data;
receiving, by the network node, information from a controller;
selecting, by the network node, a first path from a plurality of paths within a network based on the information; and
directing, by the network node, application traffic along the first path, wherein the first path is associated with an energy efficiency path quotient.

9. The method of claim 8, wherein the energy efficiency data comprises in-situ Operations, Administration, and Maintenance (iOAM) data that is collected by one or more iOAM probe packets.

10. The method of claim 9, wherein:
the network node is a software-defined wide area network (SD-WAN) endpoint;
the network is an SD-WAN network; and
the network node initiates the one or more iOAM probe packets along possible paths through the SD-WAN network.

11. The method of claim 9, wherein:
an iOAM probe packet of the one or more iOAM probe packets comprises an iOAM management frame; and
the iOAM probe packet collects the energy efficiency data within a generic customer data field of the iOAM management frame.

12. The method of claim 8, wherein the energy efficiency path quotient is based at least in part on an energy efficiency node quotient associated with the network node.

13. The method of claim 12, wherein the energy efficiency node quotient is calculated by dividing a total aggregate throughput of the network node by a total power consumption of the network node at a given moment in time.

14. The method of claim 8, wherein the energy efficiency data comprises at least one of the following:
a product type associated with the network node;
a power source associated with the network node;
a number of power supplies connected to the network node;

an identification of one or more modules installed on the network node;

a power consumption efficiency associated with the network node; or an indication of whether an energy source associated with the network node is renewable or non-renewable.

15. One or more computer-readable non-transitory storage media embodying instructions that, when executed by a processor, cause the processor to perform operations comprising:

generating energy efficiency data;

receiving, by a network node, information from a controller;

selecting a first path from a plurality of paths within a network based on the information; and directing application traffic along the first path, wherein the first path is associated with an energy efficiency path quotient.

16. The one or more computer-readable non-transitory storage media of claim 15, wherein the energy efficiency data comprises in-situ Operations, Administration, and Maintenance (iOAM) data that is collected by one or more iOAM probe packets.

17. The one or more computer-readable non-transitory storage media of claim 16, wherein:

the network node is a software-defined wide area network (SD-WAN) endpoint;

the network is an SD-WAN network; and the network node initiates the one or more iOAM probe packets along possible paths through the SD-WAN network.

18. The one or more computer-readable non-transitory storage media of claim 15, wherein:

an iOAM probe packet of the one or more iOAM probe packets comprises an iOAM management frame; and the iOAM probe packet collects the energy efficiency data within a generic customer data field of the iOAM management frame.

19. The one or more computer-readable non-transitory storage media of claim 15, wherein the energy efficiency path quotient is based at least in part on an energy efficiency node quotient associated with the network node.

20. The one or more computer-readable non-transitory storage media of claim 19, wherein the energy efficiency node quotient is calculated by dividing a total aggregate throughput of the network node by a total power consumption of the network node at a given moment in time.

* * * * *